(12) United States Patent
Trescott

(10) Patent No.: US 6,494,313 B1
(45) Date of Patent: Dec. 17, 2002

(54) STACKABLE OPEN FRONT GROCERY AND GOODS BIN WITH COMPRESSED AIR CUSHION MOBILITY

(76) Inventor: William Bernard Trescott, 8028 Hwy. 457, Bay City, TX (US) 77414

( * ) Notice: Subject to any disclaimer, the term of this patent is extended or adjusted under 35 U.S.C. 154(b) by 0 days.

(21) Appl. No.: 09/901,304

(22) Filed: Jul. 10, 2001

(51) Int. Cl.[7] .............................................. B65G 37/00
(52) U.S. Cl. ............................ 198/867.11; 198/867.14; 414/676; 220/1.5; 220/DIG. 12; 220/DIG. 14
(58) Field of Search ...................... 198/867.11, 867.14; 414/676; 206/386, 503, 505, 515, 518; 220/1.5, DIG. 12, DIG. 14

(56) References Cited

U.S. PATENT DOCUMENTS

| | | | | |
|---|---|---|---|---|
| 3,791,535 A | * | 2/1974 | Baker et al. ................ | 414/676 |
| 5,129,526 A | * | 7/1992 | Craft et al. .................. | 206/503 |
| 5,163,587 A | * | 11/1992 | Apps et al. .................. | 206/505 |
| 5,335,789 A | * | 8/1994 | Taravella et al. ........... | 206/518 |
| 6,394,274 B1 | * | 5/2002 | Cheeseman ................. | 206/503 |

* cited by examiner

Primary Examiner—Joseph E. Valenza

(57) ABSTRACT

The Stackable Open Front Grocery and Goods Bin with Air Cushion Mobility and its related conveyer together comprise a goods distribution system designed to deliver products ordered over the internet into special stores called Safety Malls which will lower the cost of everything you buy through the elimination of paper boxes and supermarket and department store janitors and stockmen. Goods ordered over the internet can be automatically be custom loaded into bins at the factory, sorted in a distribution center, and delivered to a store near your home without ever being touched by human hands. Empty bins can be nested, removed from the store, and put through a washing machine to keep the store hygienically clean.

10 Claims, 8 Drawing Sheets

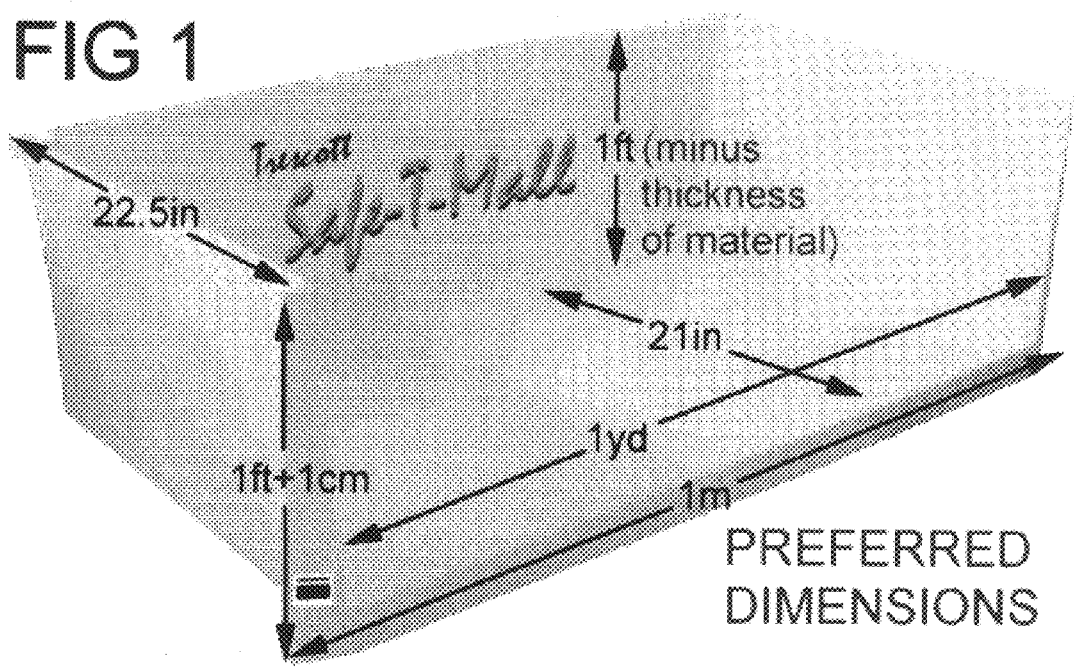

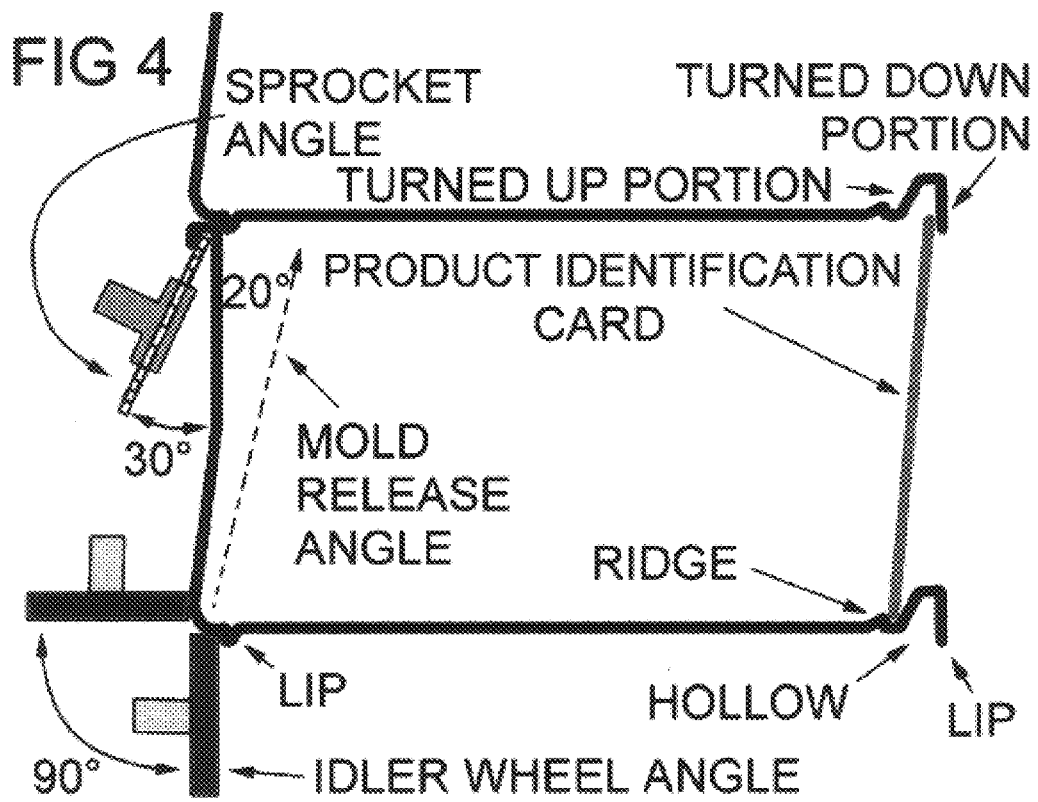
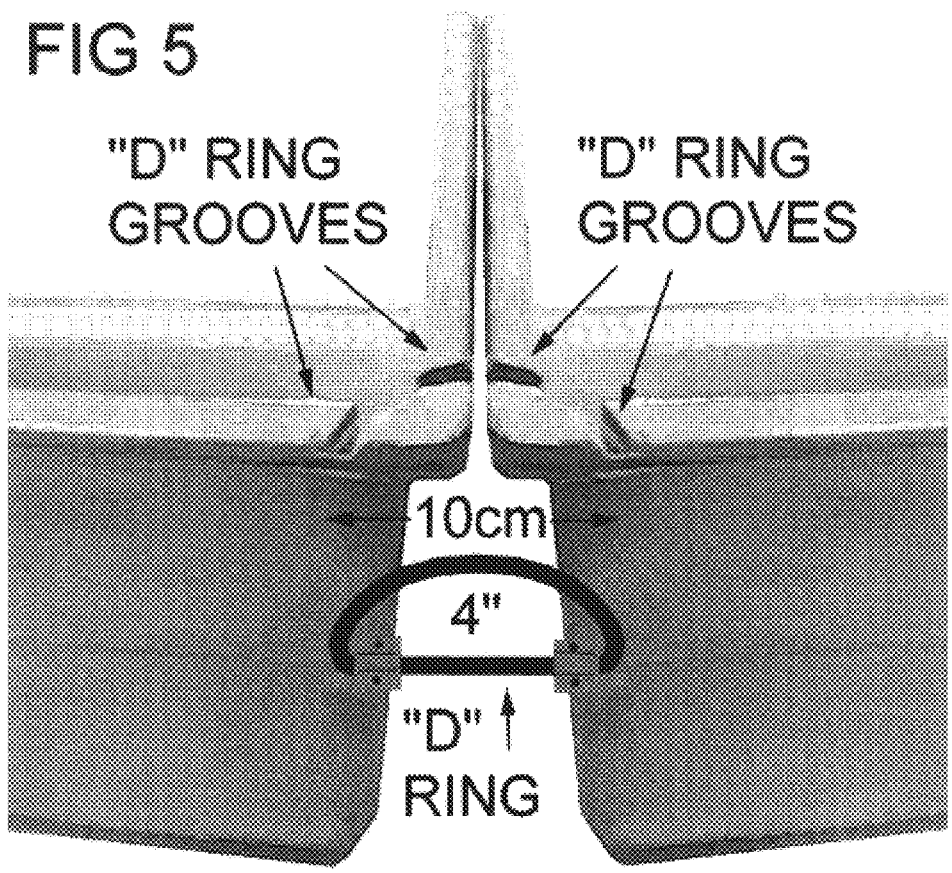

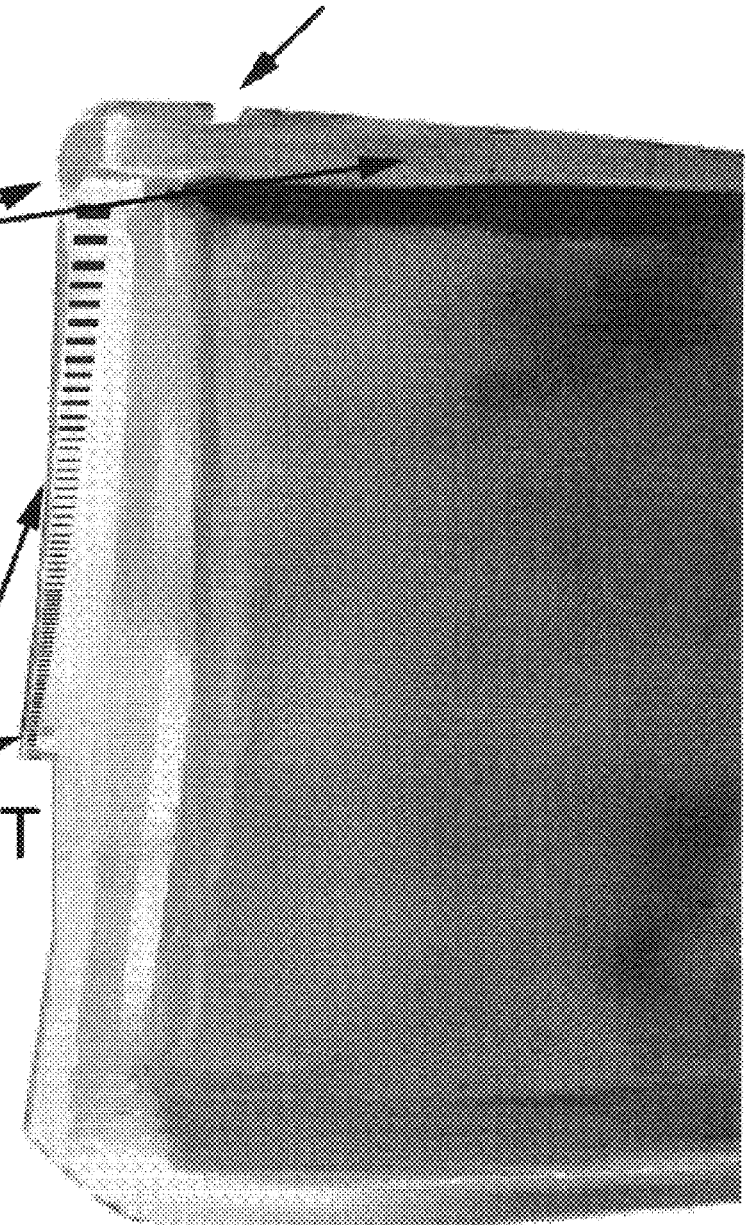

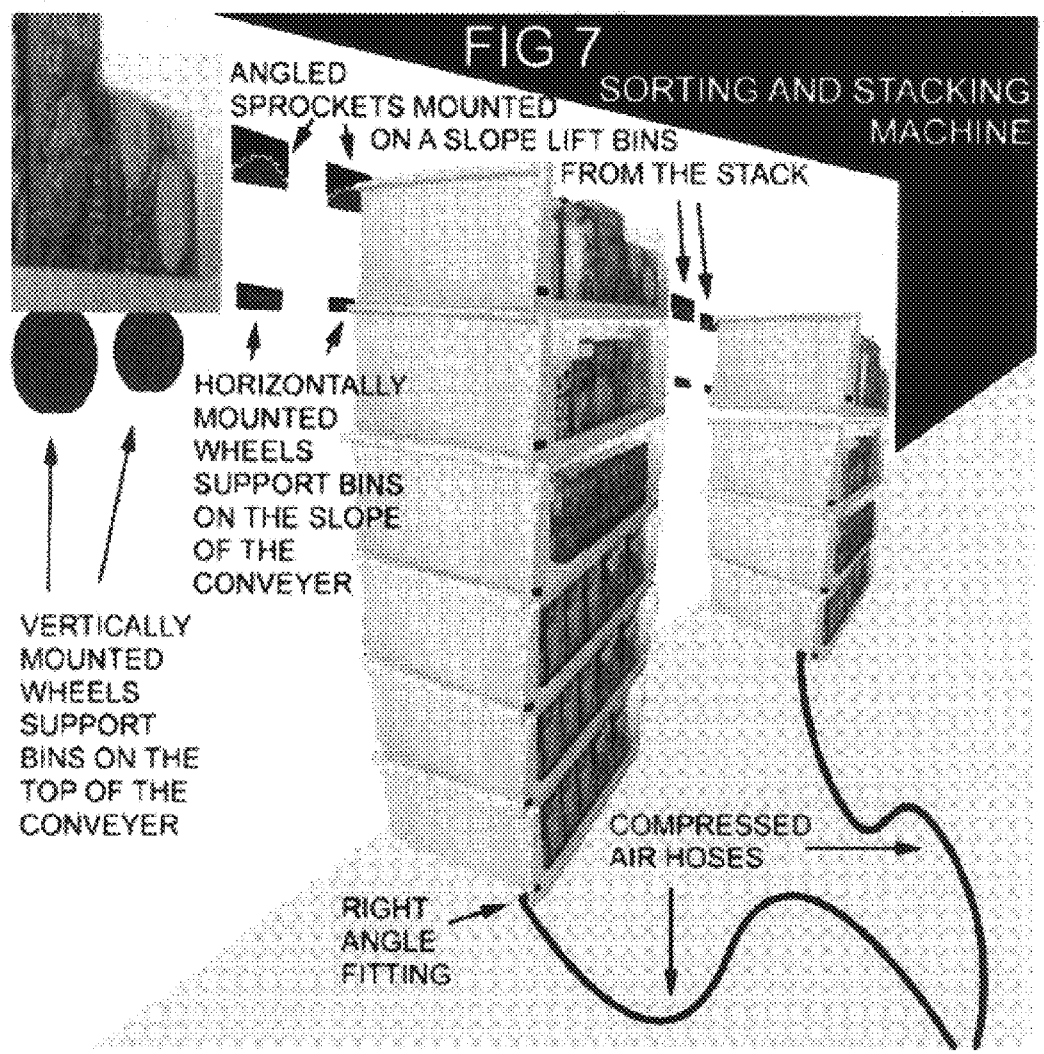
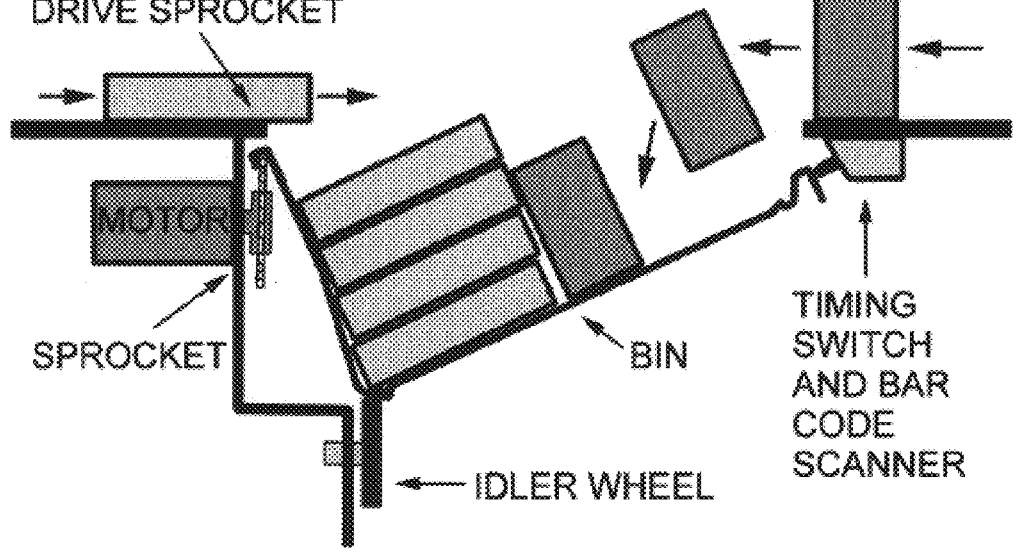

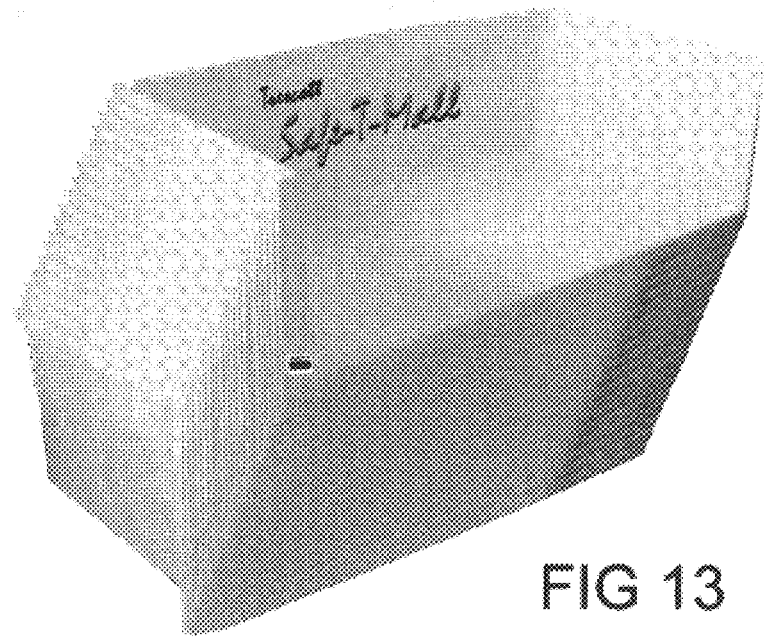
FIG 13
FIG 14
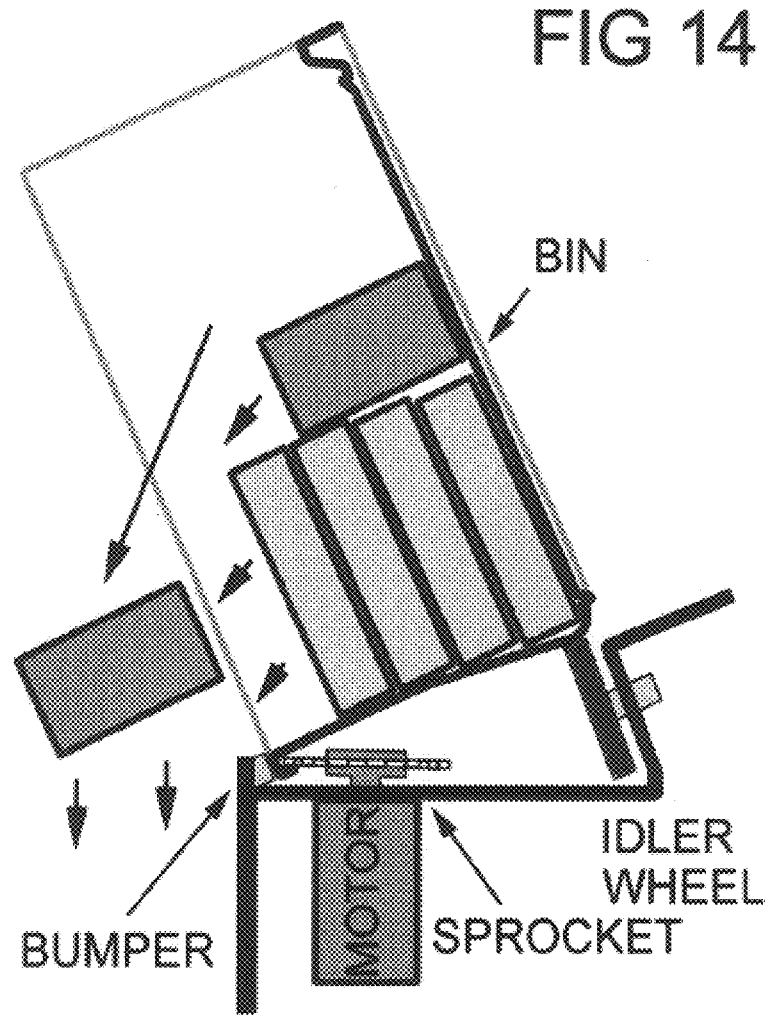

STACKABLE OPEN FRONT GROCERY AND GOODS BIN WITH COMPRESSED AIR CUSHION MOBILITY

RELATED APPLICATIONS

None

FEDERAL SPONSORSHIP

None

Background

1. Field of the Invention

The present invention pertains to the art of carrying and distributing goods—it is a type of basket that fits on a special conveyer for sorting similar baskets and bins.

2. Statement of the Problem

Designers of conveyer belts and automated distribution systems have long struggled to accommodate the infinite variety of paper boxes used to package goods. Dangerous material handling equipment such as pallet jacks and fork lifts must be used to handle fragile paper containers. Excessive manual labor is required to open, unload, then recycle corrugated boxes. Expensive store furniture such as shelving units are required to display goods once the goods are removed from their boxes. The object of this invention is to replace paper boxes and conveyer belts with a more efficient method of containing and sorting goods that can also be used to display the goods once they reach their destination.

SUMMARY OF THE INVENTION

Solution to the Problem

Shelving units made of Stackable Open Front Grocery and Goods Bins with Air Cushion Mobility standing one upon another (FIG. 7) are designed to ride on cushions of compressed air to slide easily across floors so that dangerous material handling equipment such as fork lifts are not required to load and unload trucks. By making the bins a uniform size, the conveyer and sorting mechanism is greatly simplified. Stacks of bins can be used to display goods for sale so that the goods will not need to be handled with excessive labor (FIG. 9).

BRIEF DESCRIPTION OF THE SEVERAL VIEWS OF THE DRAWING

FIG. 1 shows the preferred dimensions of the Stackable Open Front Grocery and Goods Bin FIG. 2 shows the bin as seen from the top front corner.

FIG. 4 shows a cross section of two stacked bins cut vertically from front to rear with sprocket, idler wheel, and mold release angles.

FIG. 5 shows the top rear corners of two bins and the "D" ring grooves

FIG. 6 shows the bottom rear corner, curled top edges, and sprocket pits

FIG. 7 illustrates the stacking conveyer with bins full of groceries

FIG. 8 shows a cross sectional view of a bin in the loading conveyer cut vertically front to rear

FIG. 13 illustrates nested bins FIG. 14 shows a cross section cut vertically from front to rear of the conveyer for dumping bins

DESCRIPTION OF THE PREFERRED EMBODIMENT

1. Overview (FIG. 1, FIG. 2)

Figure 3:
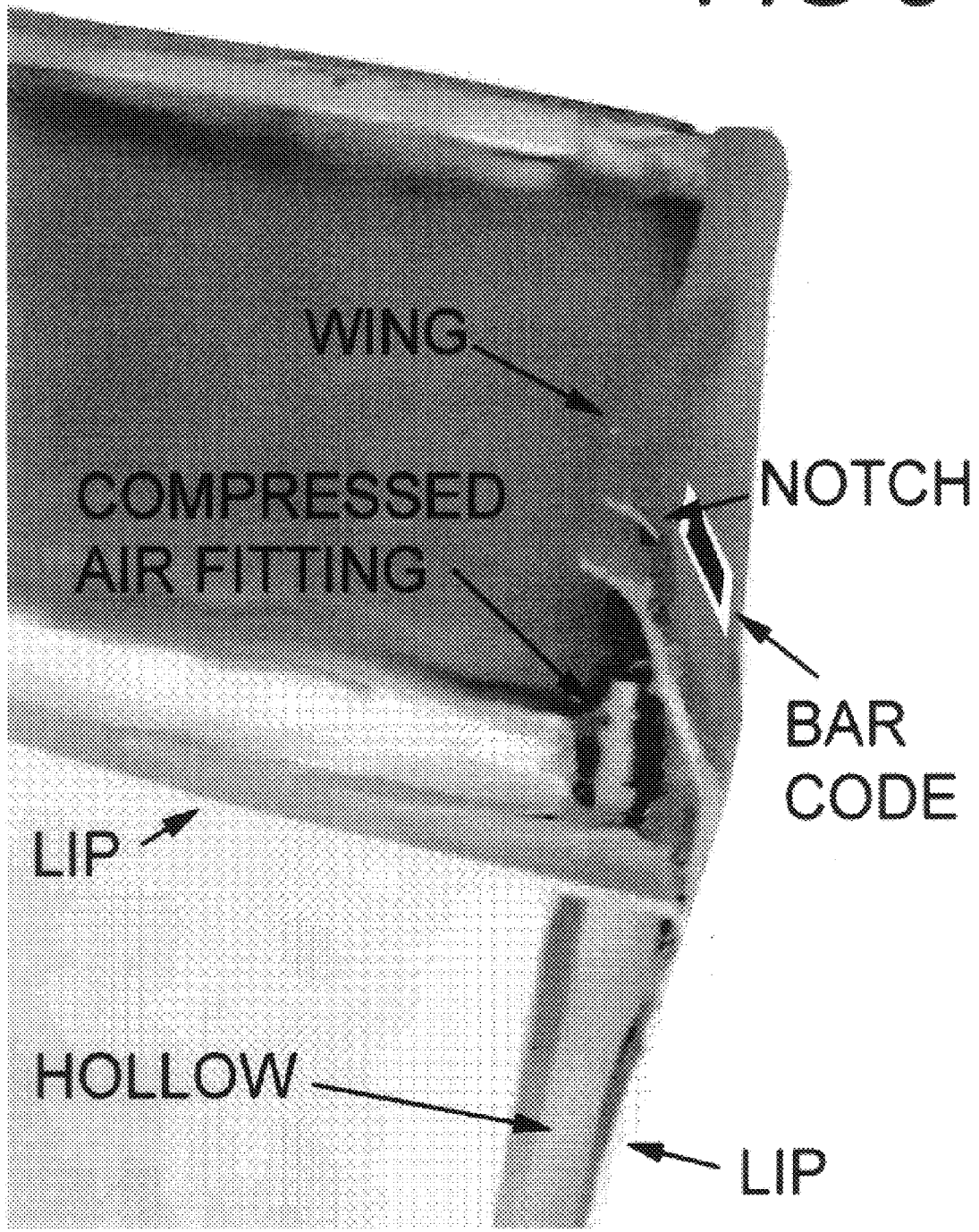
FIG. 3 shows a detailed view of the bottom front corner
Figure 10:
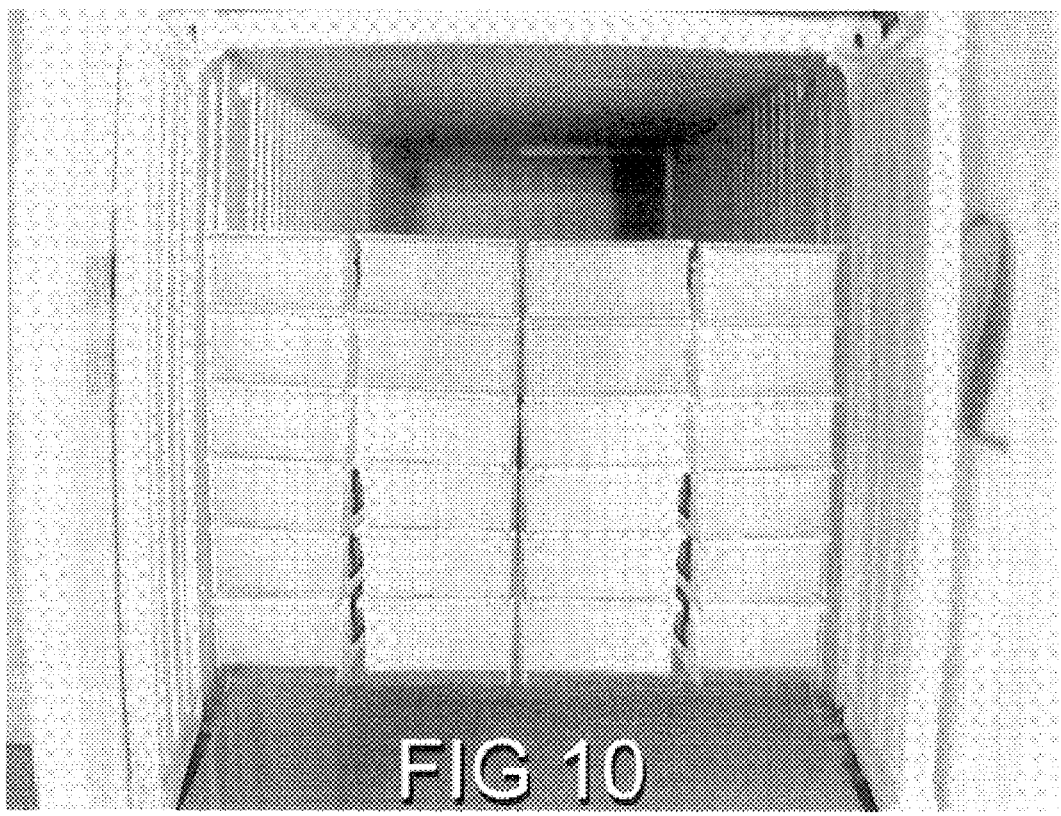
FIG. 10 illustrates bins stacked inside a shipping container awaiting delivery

The Stackable Open Front Grocery and Goods Bin with Air Cushion Mobility is distinguished from other open front bins and baskets by load bearing wings bent back from the bottom front corners which shield and protect compressed air fittings concealed behind them (FIG. 3). There are grooves in the top front corners into which the wings of the bins stacked on top fit so a stack of bins will be firmly restrained when rocking from side to side inside a moving vehicle (FIG. 2, FIG. 10). The wings do not prevent bins from being nested to save space (FIG. 13).

2. Air Cushion Lip (FIG. 3, FIG. 4)

Figure 9:
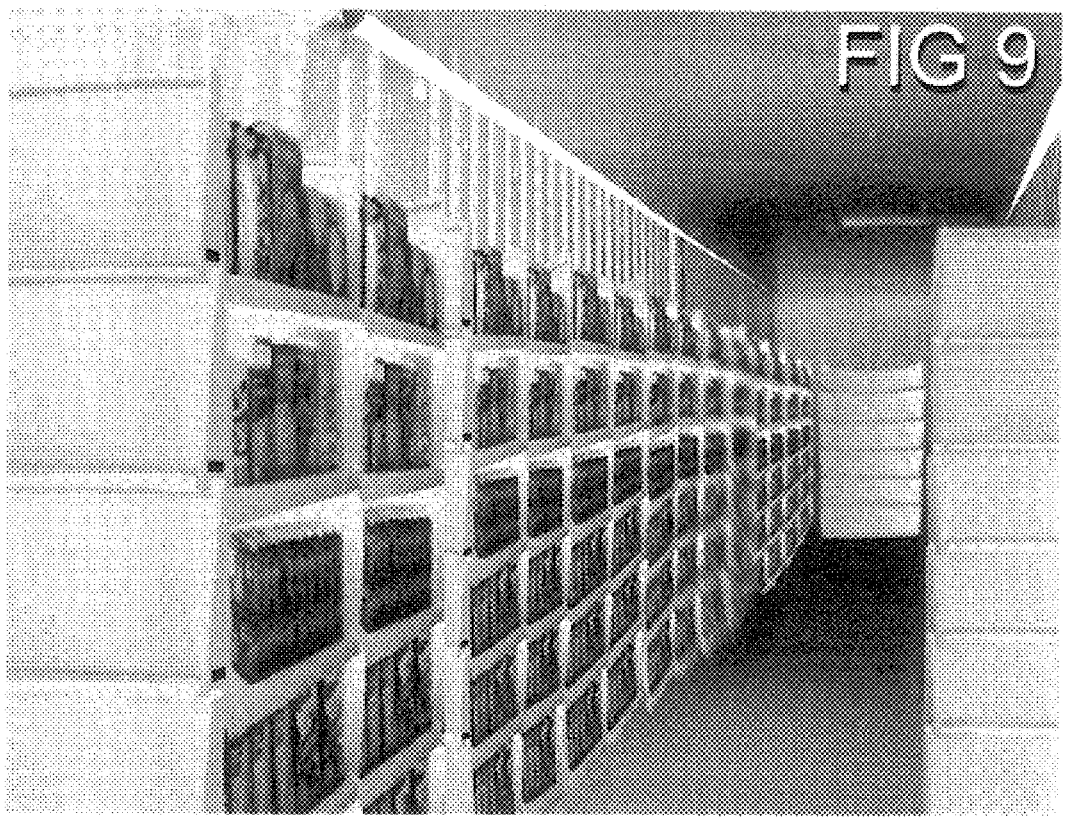
FIG. 9 illustrates stacks of bins displaying goods inside a store

There is a molded lip around the bottom circumference of the bin to contain a cushion of compressed air when the bin is sitting on the floor that will allow it to fly like a hovercraft when a compressed air hose is attached (FIG. 3, FIG. 7). The front edge of this lip is turned upward to prevent goods inside the bin from sliding out and it is also turned downward to contain the cushion of air (FIG. 4). There is a hollow formed in the front bottom edge where the lip turns up and down which can be used to insert a rigid product identification card (FIG. 4) that will prevent goods in the bin stacked below it from falling out during transport. The product identification card is inserted by first shoving the card upward into the hollow of the bin above the card and then dropping the card behind the turned up portion of the bin below the card to secure the goods inside the bin. There is a small vertical ridge molded into the inside of the bottom of the bin to secure the card (FIG. 2, FIG. 4). Compressed air fittings with one way valves to prevent the escape of air pressure are inserted into the sides of the hollow bottom front edge and they are angled so that a hose with a right angle compressed air fitting on the end (FIG. 7) can be pressed onto the bin's compressed air fitting (FIG. 3) and pulled on like a rope to move the stack of bins over the floor without breaking the fittings (FIG. 7). The hose's right angle fitting (FIG. 7) is restrained by a notch in the protective wing which will absorb the force of pulling on the hose (FIG. 2, FIG. 3). Each top rear corner of the bin has two notches forming a quarter circle (FIG. 5) so that a 10 cm (4 inch) semicircular "D" ring attached to the inner wall of a truck trailer or cargo container can flop down into these notches when the corners of two bins are side by side underneath the "D" ring. The "D" rings will allow a partially loaded truck to carry tall stacks of bins against the walls (FIG. 9).

3. Materials

The preferred embodiment of the Stackable Open Front Grocery and Goods Bin with Air Cushion Mobility is injection molded plastic. The mold release angle is inclined approximately 20 degrees up and to the front (FIG. 4). The bottom mold release angle is inclined approximately 20 degrees down and to the rear. The sides of the bin are molded with an 8 to 10 degree release angle and the top edge of each side is turned outward and curled downward so form an approximately 2 cm wide curled ledge than can be used for picking up and carrying the bin by hand (FIG. 6). The top back edge of the bin is also turned outward to form about a 2 cm wide ledge than can be used for picking up and carrying the bin by hand, but the void under the rear curl is cast solid except for pits about 1 cm wide and 2 cm apart on the underside of this ledge to engage the sprockets of the bin's associated conveyer machinery (FIG. 6, FIG. 7). The top half of the back of the bin is vertical, but the bottom half of the back of the bin is tilted inward with approximately a 10 degree angle so that a plumb line hung over the top edge will exactly touch the radius of curvature where the back of the bin joins the bottom of the bin (FIG. 4, FIG. 6). It is because of this that the mold release angle must be approximately 20 degrees tilted toward the front and the bottom front of the bin be turned up no more than about 62 degrees to achieve efficient mold release (FIG. 4). The distance between a plumb line hung over the top rear edge and the lip containing the air cushion on the bottom rear edge of the bin will be about 2 cm so that the back of the lip will touch the front of the back ledge of the bin stacked below it to prevent stacked bins from shifting during transit (FIG. 4).

4. Preferred Dimensions (FIG. 1)

OD=Outer Dimension ID=Inner Dimension

The preferred dimensions of the Stackable Open Front Grocery and Goods Bin with Air Cushion Mobility are exactly 1 meter wide OD, 1 yard wide ID, 1 foot+1 cm high OD, 1 foot (minus the thickness of the material) high ID, with 1 foot stacking height (the exact distance between any two similar points on two stacked bins being exactly one vertical foot), and 22½ inches deep OD (minus tolerances) so that four bins can fit front to rear across a 90 inch wide ID truck cargo body or cargo container (FIG. 10). The top ledges should be 2 cm wide and the number of pits under the top back ledge should be exactly 32 and they should be 1 cm wide with 2 cm between them with the "D" ring grooves in the top rear corners spaced neatly between the pits so as not to create a weakness in the material. The inner radius of the joint between the back and sides of the bin should be greater than the outer radius so that material is bulked up in the corners to compensate for the reduction in corner strength resulting from the rear "D" ring grooves being in close proximity to the pits on either side. The corners should be strong enough to support the weight of the bin when it is loaded with 100 kg (220 pounds.) of goods when handled on the sorting and stacking conveyer described below (FIG. 7). The release angle of the back of the pits should be 30 degrees. The release angle in the front of the pits should be vertical. The depth of the pits should be 1 cm and the area of the pits at their highest point should be no less than 5 mm×5 mm. The depth of the grooves in all of the top corners must exactly equal the height of the air cushion lip and this dimension should be 1 cm. The air cushion lip should be positioned 2 cm forward of the back of the bin and 2 cm inward from the bottom edges of the bin. The product identification card should be 1 foot by 3 feet in size.

The "D" rings for the bins inside truck bodies and intermodal cargo containers should be mounted in 1 foot increments from the floor of the vehicle with "D" rings exactly 3 feet and 6 feet above the floor with centers one meter apart. The "D" rings should have the capability of standing vertically so that they will automatically fall into the grooves when a stack of bins is slammed against them. A thin metal yardstick inserted between the bins can be used to release the "D" rings to avoid unstacking them.

5. Conveyer (FIG. 7)

The conveyer for loading and sorting bins consists of a row of power driven sprockets above a row of weight bearing idler wheels mounted to a wall or other vertical structure so that sprocket teeth engage the pits under the top rear edges of bins and the idler wheels support the bottom rear edges of bins. The wheels may protrude from the wall or vertical support more than the sprockets so that the bins will be carried on the conveyer tilted at an angle to prevent goods from falling out of the bins during loading. The idler wheels may be vertically mounted or horizontally mounted (FIG. 4) and may touch the bottom edge radius of the bin at any angle between 0 and 90 degrees. Sprockets may drive the bins up or down hill and even around turns by first tilting the bins onto their backs. Note that only the bottom half of the back of the bin is angled, so product may spill out of the bin if the bin is tilted onto its back when more than half full. It is best for bins to go up or down hill while on turns like a roller coaster so that the bin will not need to be tilted all the way onto its back. The sprockets may be vertically mounted or they may engage the pits in the back of the bin at any angle up to 30 degrees from vertical (FIG. 7, FIG. 4). On long straight conveyers, only every other sprocket needs to be powered and they should be spaced in intervals of ½ meter. Idler wheels should be spaced every ¼ meter.

6. Bin Self-loader (FIG. 8)

Goods may be automatically loaded into bins off the end of an assembly line by tilting the bins on the conveyer 30 to 45 degrees (so that the back of the bin is lower than the front) while passing the bins under a shelf equipped with a device to propel the product into the bin (such as an air ram or a corkscrew device similar to vending machines that dispense cigarettes and potato chips). Bins can be loaded from shelves on both sides of the conveyer provided that the rear of the bin is loaded first. Products loaded from behind the bin will be stacked vertically inside the bin and products loaded from the front of the bin will be loaded side by side inside the bin. Canned goods and smaller products can be double stacked by laying a 3 foot by 21 inch card over the product in the bottom of the bin and then raising the shelf from upon which the next product is loaded. If a variety of very small products is to loaded, the conveyer should go up hill or down hill at a 20 to 30 degree angle during the loading process so goods pushed into the bins will stack by gravity into the bottom corners.

Figure 11:
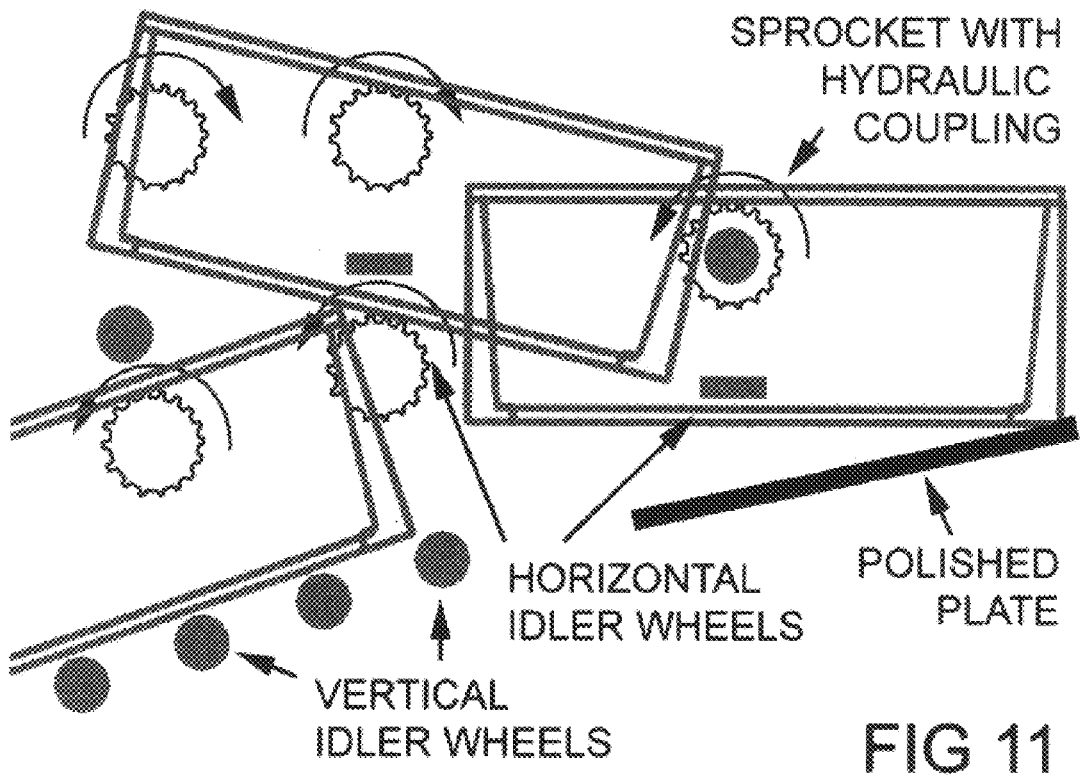
FIG. 11 shows the cascading mechanism for lowering bins onto conveyers going in the opposite direction.

7. Cascading Mechanism (FIG. 11)

Conveyers may be connected in cascading fashion so that bins that reach the end of one conveyer will automatically be tipped onto the conveyer below. The cascading mechanism consists of a powered sprocket with a hydraulic coupling turning in the opposite direction one half meter beyond and six inches below the end of the conveyer (FIG. 11). One foot below and beyond that is a polished horizontal plate tilted to catch and stop the bin. When the bin reaches the end of the conveyer, it falls onto the cascading mechanism and overwhelms the hydraulic coupling until it reaches the plate. The hydraulic mechanism then gently accelerates the bin in the opposite direction until it falls onto the conveyer below.

8. Timing Switch (FIG. 8)

Bar codes will be printed on the front of each wing (FIG. 2) that can be scanned by the loading machine as the bins go by. A computer can be programmed to automatically assign an empty bin to a destination and automatically load it with proper amount of goods bound for that destination. The conveyer should move at a constant speed. The timing mechanism for the product loader should be equipped with a lever directly under the bar code reader that will touch the angled front wing of the bin and depress a switch as the front edge of the bin rubs against the lever. The computer should be programmed to remember how much product has been loaded into each bin so that additional product will be pushed into the bin at the proper elapsed time after the timing switch is activated to avoid overloading one end of the bin. Human loaders should only need to hand load the bins when they are nearly full. Product identification cards can be inserted into the fronts of bins to prevent goods from falling out when bins are stacked upon other bins. The computer should print a label to be attached to the front of the product identification card to indicate the contents and destination of each bin.

Figure 12:
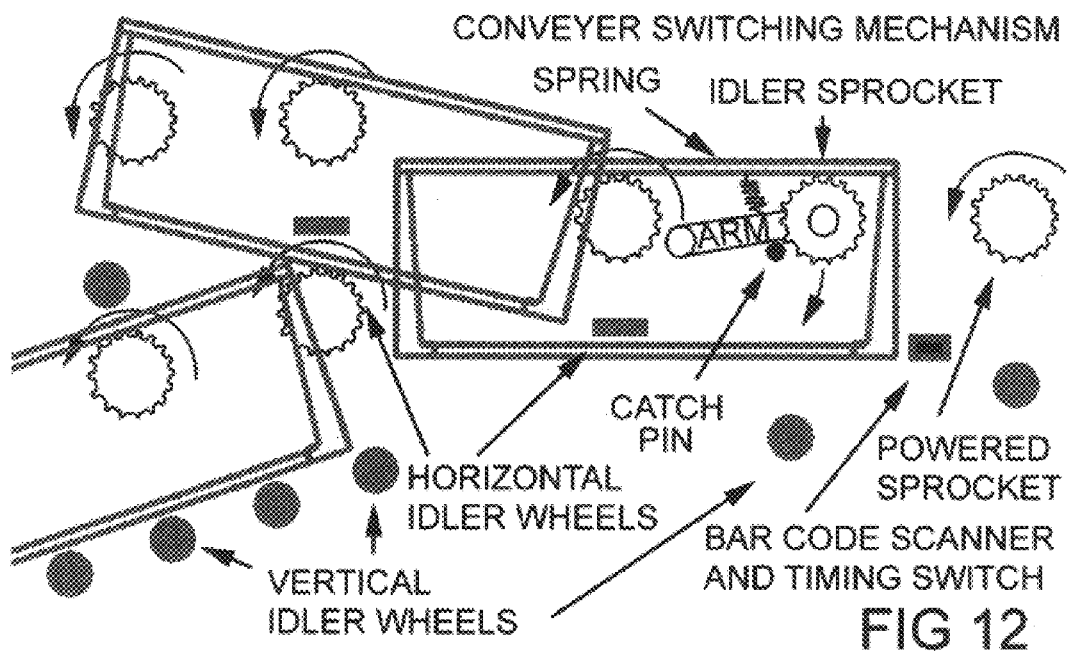
FIG. 12 shows the switching mechanism for diverting bins onto more than one conveyer

9. Switching Mechanism (FIG. 12)

The mechanism for switching bins onto conveyers above and below (or to the left and right if the bins are laying on their backs) consists of an unpowered idler sprocket attached to an arm held up by a catch pin. To send the bin to the lower conveyer, the catch is left in place. To send the bin to the upper conveyer, the catch pin is pulled to release the arm when the bin is supported by the sprockets to the right and to the left of it a certain time after it passes the timing switch. To reduce wear on the catch pin, the idler sprocket can be mounted slightly lower than the other sprockets. The idler sprocket falls under the weight of the bin and the bin tips up to the upper conveyer (FIG. 12). A spring returns the arm to normal position. A bevel on the end of the catch pin (like a door latch) allows the arm to click into place to be ready to support the weight of the next bin.

To merge bins from two conveyers on to one, the above mechanism is operated in reverse. The idler sprocket can be replaced by a normal fixed sprocket if the merging mechanism is not to be used for switching.

For the sake of production flexibility, segments of conveyers can be mounted as portable free standing units with sprockets up to ½ meter apart using alternating current to synchronize the speed of the drive motors. The layout of the production floor can then be easily changed by moving loading and switching mechanisms around as needed. It is also possible for personnel to pass through free standing segments of moving conveyers provided they watch out for bins. If conveyers are mounted this way, special guards must be mounted to prevent hair or clothing from being caught in the sprockets.

10. Lifting and Sorting Machine (FIG. 7)

Stacks of bins of varying height may be lifted onto a conveyer to be sorted by pushing the stacks on cushions of compressed air against a conveyer with powered sprockets tilted between 10 and 30 degrees from vertical with its idler wheels horizontal (FIG. 4) arranged on a slope of six inches in one meter (FIG. 7). An angled sprocket will engage the corner of the top bin of the stack and lift it up onto other conveyer sprockets. Once a bin has climbed up the slope to the top of the conveyer, it can be unloaded, sorted, dumped (FIG. 14) or rolled down the slope an unpowered conveyer with similarly angled sprockets onto another stack of bins waiting to be shipped to the same destination (FIG. 7). The stack to receive the bin must be positioned by hand under the conveyer so the front wing of the bin rolling down the conveyer falls into the groove in the top front corner of the top bin in the stack. It is important for the operator to match the motion of the stack with the bin coming down the conveyer for the machine to work smoothly. The top corner of the product identification card should also be tucked into the hollow in the upper bin at this time. Pulling the stack away from the conveyer at a slight angle will drop the rolling bin onto the stack with a minimum of effort. The stack can then be pushed to a position under a higher part of the conveyer slope to receive yet another bin. It is possible to secure the product identification card on the top bin in the stack with a one meter long rod laid in the top front grooves of the bin. Product identification cards may be manufactured with built in rods or with crushable 1 meter wide wings in the top corners that extend into the grooves.

11. Conveyer Materials

The preferred embodiment of the sorting machine (FIG. 7) is a steel beam structure behind a smooth polished wall with plastic or hard rubber wheels and metal sprockets that project through the wall as little as necessary. Danger signs to protect hands and fingers should be positioned around the sprockets.

The loading conveyer (FIG. 8) should be constructed so that the sprockets are concealed under a shelf so employees will not get their clothing, hands, or fingers caught in them. If possible the sprockets should be housed within a protective cover so that only the top of the sprocket is visible. There is excellent maintenance access to all sides of the machine when there is no bin in the conveyer, but as with all toothed sprockets and gears, precautions must be taken to ensure the safety of those who operate the machine. If bins are turned upside down for unloading (FIG. 14), a nylon bumper or idler wheel should be used to prevent the bin from sliding off the sprocket. A second wheel can roll along the front of the bin if necessary.

What is claimed:

1. An open front basket or bin with bent back bottom front corner wings which provide protection for compressed air fittings carry the weight of bins stacked above fit into angled grooves in the top front corners of bins stacked below it to prevent movement during transit allow the entire bin to be molded in one piece and nested with other bins when empty to save space.

2. The basket or bin in claim 1 with angled grooves in the top front corners to secure the bottom corner wings of bins stacked above to prevent movement during transit.

3. The basket or bin in claim 1 with angled grooves in the top rear corners for the purpose of securement.

4. The basket or bin in claim 1 with a curled outward top edge.

5. The edge in claim 4 with a friction enhancing surface.

6. The basket or bin in claim 1 with a lip on the bottom edge which contains an air cushion to ease movement over floors and smooth surfaces engages the top edges of bins stacked below.

7. The basket or bin in claim 1 with a bent rear panel.

8. The basket or bin in claim 1 with a curled front edge which prevents goods from falling out of the bin secures a rigid product identification card contains an air cushion to ease movement over floors.

9. The basket or bin in claim 1 with a vertical ridge behind the turned up front edge to secure a rigid product identification card.

10. The bent back wings in claim 1 with notches to provide access to the compressed air fittings.

* * * * *